US012545262B2

(12) United States Patent
Misu et al.

(10) Patent No.: US 12,545,262 B2
(45) Date of Patent: Feb. 10, 2026

(54) SYSTEM AND METHOD FOR PREDICTING DRIVER SITUATIONAL AWARENESS

(71) Applicant: Honda Motor Co., Ltd., Tokyo (JP)

(72) Inventors: Teruhisa Misu, San Jose, CA (US); Kumar Akash, Milpitas, CA (US)

(73) Assignee: Honda Motor Co., Ltd., Tokyo (JP)

( * ) Notice: Subject to any disclaimer, the term of this patent is extended or adjusted under 35 U.S.C. 154(b) by 294 days.

(21) Appl. No.: 17/708,294

(22) Filed: Mar. 30, 2022

(65) Prior Publication Data

US 2023/0256973 A1 Aug. 17, 2023

Related U.S. Application Data

(60) Provisional application No. 63/309,178, filed on Feb. 11, 2022.

(51) Int. Cl.
*B60W 40/08* (2012.01)
*B60W 60/00* (2020.01)

(52) U.S. Cl.
CPC ........ *B60W 40/08* (2013.01); *B60W 60/0051* (2020.02); *B60W 2540/225* (2020.02); *B60W 2540/229* (2020.02); *B60W 2554/404* (2020.02); *B60W 2554/406* (2020.02)

(58) Field of Classification Search
CPC ............. B60W 40/08; B60W 60/0051; B60W 2540/225; B60W 2540/229; B60W 2554/404; B60W 2554/406; B60W 2040/0818
See application file for complete search history.

(56) References Cited

U.S. PATENT DOCUMENTS

| | | | |
|---|---|---|---|
| 2021/0053586 A1* | 2/2021 | Domeyer | G06F 3/013 |
| 2022/0032938 A1* | 2/2022 | Liu | B60W 40/08 |
| 2022/0155857 A1* | 5/2022 | Lee | G06F 3/013 |
| 2022/0206575 A1* | 6/2022 | Zhao | G06F 3/013 |
| 2022/0327840 A1* | 10/2022 | Ambeck-Madsen | B60W 40/04 |

(Continued)

OTHER PUBLICATIONS

Feuerstack, A model-driven tool for getting insights into car drivers' monitoring behavior, Jun. 1, 2017 (Year: 2017).*

(Continued)

*Primary Examiner* — Navid Z. Mehdizadeh
*Assistant Examiner* — Micah Chuen-Him Cheng
(74) *Attorney, Agent, or Firm* — Rankin, Hill & Clark LLP

(57) ABSTRACT

A system and method for predicting a driver's situational awareness that includes receiving driving scene data associated with a driving scene of an ego vehicle and eye gaze data to track a driver's eye gaze behavior with respect to the driving scene. The system and method also include analyzing the eye gaze data and determining an eye gaze fixation value associated with each object that is located within the driving scene and analyzing the driving scene data and determining a situational awareness probability value associated with each object that is located within the driving scene that is based on a salience, effort, expectancy, and a cost value associated with each of the objects within the driving scene. The system and method further include communicating control signals to electronically control at least one component based on the situational awareness probability value and the eye gaze fixation value.

20 Claims, 5 Drawing Sheets

(56) References Cited

U.S. PATENT DOCUMENTS

2023/0133891 A1* 5/2023 Lu .................. G06Q 30/0641
705/26.7

OTHER PUBLICATIONS

John R Anderson, Daniel Bothell, Michael D Byrne, Scott Douglass, Christian Lebiere, and Yulin Qin. 2004. An Integrated theory of the mind. Psychological review 111, 4 (2004), 1036.

John R Anderson, Michael Matessa, and Christian Lebiere. 1997. ACT-R: A theory of higher level cognition and its relation to visual attention. Human-Computer Interaction 12, 4 (1997), 439-462.

Shi Cao, Yulin Qin, Lei Zhao, and Mowei Shen. 2015. Modeling the development of vehicle lateral control skills in a cognitive architecture. Transportation research part F: traffic psychology and behaviour 32 (2015), 1-10.

Arindam Das and Wolfgang Stuerzlinger. 2010. Proactive interference in location learning: A new closed-form approximation. In Proceedings of the 10th international conference on cognitive modeling. Citeseer, 37-42.

Mica R Endsley. 1995. Toward a theory of situation awareness in dynamic systems. Human factors 37, 1 (1995), 32-64.

Mica R Endsley. 2017. Direct measurement of situation awareness: Validity and use of SAGAT. In Situational awareness. Routledge, 129-156.

Mica R Endsley. 2021. A systematic review and meta-analysis of direct objective measures of situation awareness: a comparison of SAGAT and SPAM. Human factors 63, 1 (2021), 124-150.

Brian F Gore, Becky L Hooey, Christopher D Wickens, and Shelly Scott-Nash. 2009. A computational implementation of a human attention guiding mechanism in MIDAS v5. In International conference on digital human modeling. Springer, 237-246.

William J Horrey, Christopher D Wickens, and Kyle P Consalus. 2006. Modeling drivers' visual attention allocation while interacting with in-vehicle technologies. Journal of Experimental Psychology: Applied 12, 2 (2006), 67.

Robert JK Jacob and Keith S Karn. 2003. Eye tracking in human-computer interaction and usability research: Ready to deliver the promises. In The mind's eye. Elsevier, 573-605.

Zhenji Lu, Xander Coster, and Joost De Winter. 2017. How much time do drivers need to obtain situation awareness? A laboratory-based study of automated driving. Applied ergonomics 60 (2017), 293-304.

Jason S McCarley, Christopher D Wickens, Juliana Goh, and William J Horrey. 2002. A computational model of attention/situation awareness. In Proceedings of the Human Factors and Ergonomics Society Annual Meeting, vol. 46. Sage Publications Sage CA: Los Angeles, CA, 1669-1673.

Umair Rehman, Shi Cao, and Carolyn MacGregor. 2019. Using an Integrated Cognitive Architecture to Model the Effect of Environmental Complexity on Drivers' Situation Awareness. In Proceedings of the Human Factors and Ergonomics Society Annual Meeting, vol. 63. Sage Publications Sage CA: Los Angeles, CA, 812-816.

Dario D Salvucci. 2006. Modeling driver behavior in a cognitive architecture. Human factors 48, 2 (2006), 362-380.

Chris R Sims and Wayne D Gray. 2004. Episodic versus Semantic Memory: An Exploration of Models of Memory Decay in the Serial Attention Paradigm. In ICCM. 279-284.

Christopher D Wickens, Juliana Goh, John Helleberg, William J Horrey, and Donald A Talleur. 2003. Attentional models of multitask pilot performance using advanced display technology. Human factors 45, 3 (2003), 360-380.

Steven Yantis. 1993. Stimulus-driven attentional capture. Current Directions in Psychological Science 2, 5 (1993), 156-161.

Haibei Zhu, Teruhisa Misu, Sujitha Martin, Xingwei Wu, and Kumar Akash. 2021. Improving Driver Situation Awareness Prediction using Human Visual Sensory and Memory Mechanism. In 2021 IEEE/RSJ International Conference on Intelligent Robots and Systems (IROS 2021) Proceedings. IEEE.

Hyungil Kim and Joseph L Gabbard. 2019. Assessing distraction potential of augmented reality head-up displays for vehicle drivers. Human factors (2019), 0018720819844845.

Hyungil Kim, Sujitha Martin, Ashish Tawari, Teruhisa Misu, and Joseph L Gabbard. 2020. Toward Real-Time Estimation of Driver Situation Awareness: An Eye-tracking Approach based on Moving Objects of Interest. In 2020 IEEE Intelligent Vehicles Symposium (IV). IEEE, 1035-1041.

Richard M Taylor. 2017. Situational awareness rating technique (SART): The development of a tool for aircrew systems design. In Situational awareness. Routledge, 111-128.

* cited by examiner

SYSTEM AND METHOD FOR PREDICTING DRIVER SITUATIONAL AWARENESS

This disclosure claims priority to U.S. Provisional Application Ser. No. S/N 63/309,178 filed on Feb. 11, 2022, which is expressly incorporated herein by reference in its entirety.

BACKGROUND

Situational awareness may be important to drivers in automated driving. Maintaining a driver's awareness within a driving environment may help a driver avoid unnecessary interventions and negotiate challenging scenarios where human takeovers may be required. Measuring a driver's awareness based solely on their visual attention might be a promising but insufficient predictor of a driver's situational awareness. It is because the driver's awareness based on solely on their visual attention involves not only "seeing the object", but also "memorizing and recalling the object".

BRIEF DESCRIPTION

According to one aspect, a computer-implemented method for predicting a driver's situational awareness that includes receiving driving scene data associated with a driving scene of an ego vehicle and eye gaze data to track a driver's eye gaze behavior with respect to the driving scene. The computer-implemented method also includes analyzing the eye gaze data and determining an eye gaze fixation value associated with each object that is located within the driving scene that is based on an eye gaze fixation time associated with each of the objects within the driving scene. The computer-readable method additionally includes analyzing the driving scene data and determining a situational awareness probability value associated with each object that is located within the driving scene that is based on a salience, effort, expectancy, and a cost value associated with each of the objects within the driving scene. The computer-readable method further includes communicating control signals to electronically control at least one component of the ego vehicle based on the situational awareness probability value and the eye gaze fixation value associated with each of the objects that are located within the driving scene.

According to another aspect, a system for predicting a driver's situational awareness that includes a memory storing instructions when executed by a processor. The instructions cause the processor to receive driving scene data associated with a driving scene of an ego vehicle and eye gaze data to track a driver's eye gaze behavior with respect to the driving scene. The instructions also cause the processor to analyze the eye gaze data and determining an eye gaze fixation value associated with each object that is located within the driving scene that is based on an eye gaze fixation time associated with each of the objects within the driving scene. The instructions additionally cause the processor to analyze the driving scene data and determining a situational awareness probability value associated with each object that is located within the driving scene that is based on a salience, effort, expectancy, and a cost value associated with each of the objects within the driving scene. The instructions further cause the processor to communicate control signals to electronically control at least one component of the ego vehicle based on the situational awareness probability value and the eye gaze fixation value associated with each of the objects that are located within the driving scene.

According to yet another aspect, a non-transitory computer readable storage medium storing instructions that are executed by a computer, which includes a processor. The instructions perform a method that includes receiving driving scene data associated with a driving scene of an ego vehicle and eye gaze data to track a driver's eye gaze behavior with respect to the driving scene. The method also includes analyzing the eye gaze data and determining an eye gaze fixation value associated with each object that is located within the driving scene that is based on an eye gaze fixation time associated with each of the objects within the driving scene. The method additionally includes analyzing the driving scene data and determining a situational awareness probability value associated with each object that is located within the driving scene that is based on a salience, effort, expectancy, and a cost value associated with each of the objects within the driving scene. The method further includes communicating control signals to electronically control at least one component of the ego vehicle based on the situational awareness probability value and the eye gaze fixation value associated with each of the objects that are located within the driving scene.

BRIEF DESCRIPTION OF THE DRAWINGS

The novel features believed to be characteristic of the disclosure are set forth in the appended claims. In the descriptions that follow, like parts are marked, throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
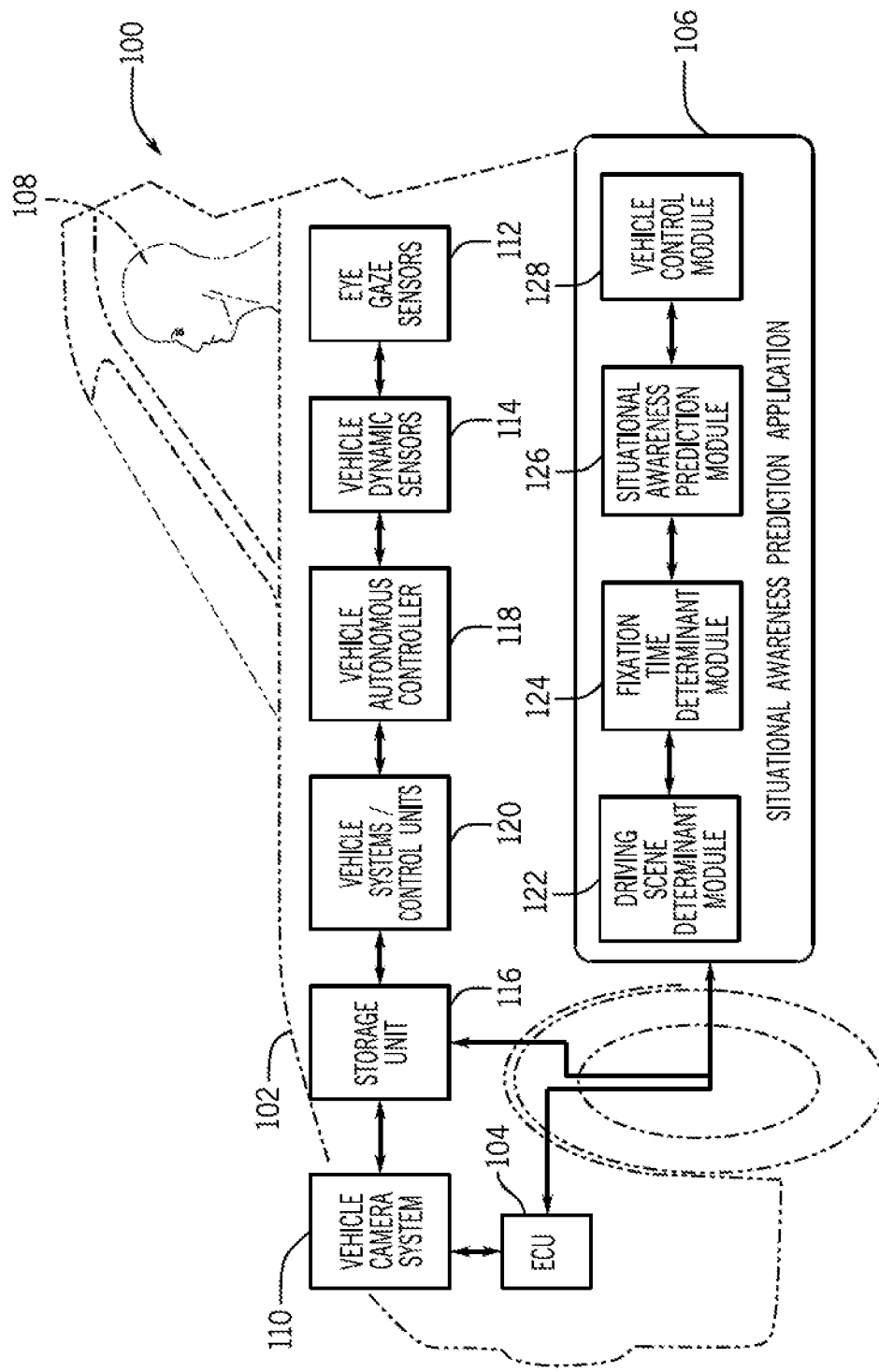
FIG. 1 is a schematic view of an exemplary system for predicting a driver's situational awareness according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components.

The bus may be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discreet logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary system 100 for predicting a driver's situational awareness according to an exemplary embodiment of the present disclosure. The components of the system 100, as well as the components of other systems, hardware architectures, and software architectures discussed herein, may be combined, omitted, or organized into different architectures for various embodiments.

Generally, the system 100 includes an ego vehicle 102 that includes an electronic control unit (ECU) 104 that executes one or more applications, operating systems, vehicle system and subsystem user interfaces, among others. The ECU 104 may also execute a situational awareness prediction application 106 that may be configured to determine a situational awareness probability value that may be respectively associated with dynamic objects (e.g., additional vehicles, pedestrians) and static objects (e.g., traffic infrastructure) that are located within a driving scene of the ego vehicle 102. The situational awareness probability values may pertain to a predicted level of situational awareness that a driver 108 of the ego vehicle 102 may have with respect to dynamic objects and static objects at one or more future time steps (t+1, t+2, t+n) that may be based on properties of the dynamic objects and the static objects that are located within the driving scene of the ego vehicle 102.

Figure 2:
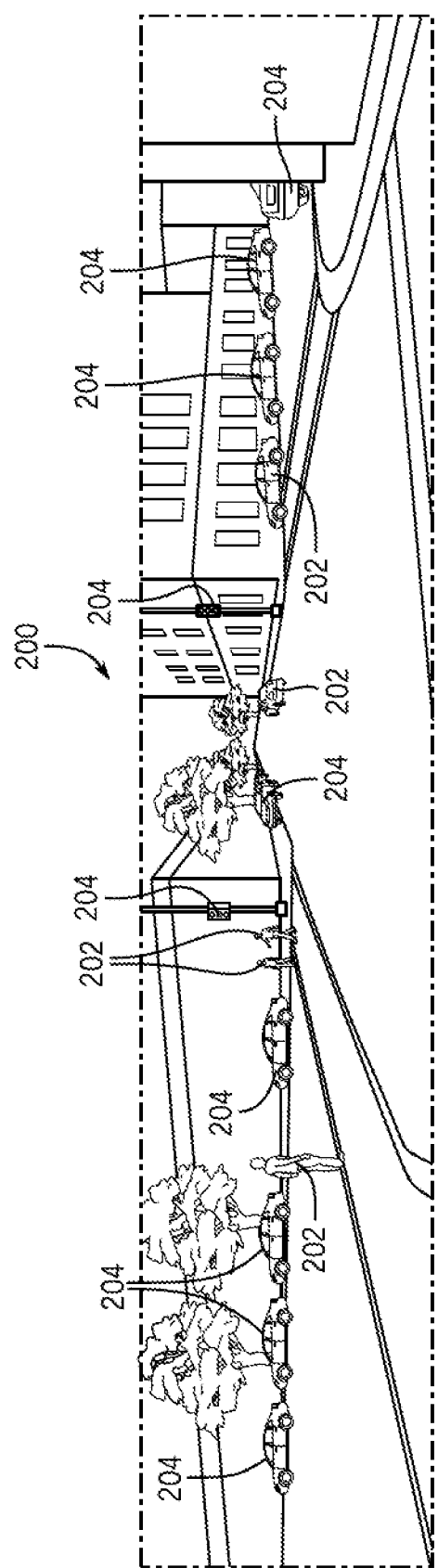
FIG. 2 is an exemplary illustration of a driving scene of an ego vehicle according to an exemplary embodiment of the present disclosure.

FIG. 2 includes an exemplary illustration of the driving scene 200 of the ego vehicle 102 according to an exemplary embodiment of the present disclosure. The driving scene 200 of the ego vehicle 102 may include a surrounding environment that may be located within a predetermined vicinity of the ego vehicle 102. The driving scene 200 may include roadways, intersections, sidewalks, dynamic objects 202 (e.g., pedestrians, other vehicles, etc.), and/or static objects 204 (e.g., traffic posts, traffic lights, buildings, trees, guardrails, etc.). With continued reference to FIG. 1 and FIG. 2, as discussed in more detail below, the situational awareness prediction application 106 may be configured to receive driving scene data from a vehicle camera system 110 of the ego vehicle 102 that pertains to the driving scene 200 of the ego vehicle 102.

In one embodiment, the situational awareness prediction application 106 may be configured to analyze the driving scene data to classify objects located within the driving scene 200. The objects 202, 204 may be classified as particular types of dynamic objects 202 (e.g., cars, trucks, pedestrians, bicyclists, etc.) and static objects 204 (e.g., traffic light, traffic signage, poles, guardrails, etc.). Upon classifying the dynamic objects 202 and static objects 204, the situational awareness prediction application 106 may be configured to identify particular types of dynamic objects 202 and particular types of static objects 204. The situational awareness prediction application 106 may further analyze the driving scene data to determine characteristics including, but not limited to, object colors, object size, object movement, and a relative position of objects 202, 204 with respect to a position of the ego vehicle 102 within the driving scene 200.

The situational awareness prediction application 106 may also be configured to label eye gaze fixations that may pertain to the eye gaze of the driver 108 of the ego vehicle 102 with respect to each dynamic object 202 and/or each static object 204 that may be located within the driving scene 200 of the ego vehicle 102. The labeling of the eye gaze fixations of the driver 108 may be determined based on eye gaze data that is output by eye gaze sensors 112 of the ego vehicle 102. In one embodiment, the labeling of eye gaze fixations may be utilized to determine eye gaze fixation values associated with each of the objects 202, 204 located within the driving scene 200. The eye gaze fixation values associated with each of the objects 202, 204 may pertain to a length of time of an eye gaze fixation of the driver's eye gaze towards each object 202, 204 within the driving scene 200 of the ego vehicle 102.

As discussed in more detail below, the situational awareness prediction application 106 may be configured to utilize a Salience, Effort, Expectancy, and Value (SEEV) framework to determine probability values that may pertain to a predicted level of situational awareness that the driver 108 of the ego vehicle 102 may have with respect to dynamic objects 202 and static objects 204 at one or more future time steps as the driver 108 is operating the ego vehicle 102 and/or as the ego vehicle 102 is being semi-autonomously/autonomously operated within the driving scene 200.

The situational awareness prediction application 106 may be configured to analyze the driving scene data to determine object based properties that may be used to determine each of the features of the SEEV framework. As discussed below, levels determined with respect to each of the features of the SEEV framework may be utilized to determine the situational awareness probability value associated with each of the objects 202, 204 that are located within the driving scene 200 of the ego vehicle 102. In particular, the situational awareness prediction application 106 may be configured to analyze the driving scene data to determine a salience level that may be associated with properties of each respective object 202, 204. The salience level may refer to the properties of each of the objects 202, 204 with respect to a likelihood that objects capture an attention of the driver 108 of the ego vehicle 102. The salience level may also be determined a product of object contrast against a background of the driving scene 200.

The situational awareness prediction application 106 may additionally be configured to analyze the driving scene data to determine an effort level associated with a level of effort that is involved in the driver 108 attending to various different objects, referred to as attention travel over different objects 202, 204. In one configuration, the effort level may be associated with an object density of the driving scene 200, as a higher object density may be associated with a higher level of effort that is involved in the attention travel over different objects 202, 204.

In one or more embodiments, the situational awareness prediction application 106 may additionally be configured to analyze the driving scene data to determine an expectancy level. The expectancy level may be associated with a respective location of each object 202, 204 within a field of view of the driver 108 of the ego vehicle 102. In some embodiments, the expectancy level may be associated with the respective position of each object 202, 204 as compared to the respective position of the ego vehicle 102. In additional embodiments, the expectancy level may be associated with the eye gaze fixation of the driver 108 of the ego vehicle 102 at a particular point in time with respect to each respective object 202, 204 located within the driving scene 200.

In one embodiment, the situational awareness prediction application 106 may also determine a cost value level as another feature of the SEEV framework that may be utilized to determine the situational awareness probability value associated with each of the objects 202, 204. The cost value level may be determined as a product of relevance and priority of each object 202, 204 with respect to a cost of missing information associated with each object 202, 204 during an operation of the ego vehicle 102. The cost of missing information associated with each object 202, 204 may be based on a classification of each object 202, 204 and/or a potential likelihood of overlap between projected path of each respective object 202, 204 and the ego vehicle 102.

The situational awareness prediction application 106 may be configured to utilize the SEEV framework to analyze the driver's potential situational awareness by analyzing object features. As discussed below, the situational awareness prediction application 106 may determine a situational awareness probability value as a linear weighted combination of the features of the SEEV framework. In particular, the situational awareness probability value may be determined as a linear weighted combination of the salience level, the effort level, the expectancy level, and the cost value level that is associated with each object 202, 204 that is located within the driving scene 200. As a linear weighted combination of the features of the SEEV framework, the situational awareness probability value may pertain to a probability of the driver 108 attending to an area in visual space that may include each respective object 202, 204 at one or more future time steps based on visual, dynamic, physical, and/or relative (i.e., relative to the ego vehicle 102) properties of each of the objects 202, 204 located within the driving scene 200.

The present disclosure accordingly describes a system and method that allows an improvement to a computer and the technology with respect to executing electronic instructions through one or more electronic components of the ego vehicle 102 to enhance the prediction of a situational awareness of vehicle drivers based on visual, dynamic, physical, and/or relative properties of objects 202, 204 that may be located within the driving scene 200 of the ego vehicle 102 and/or an eye gaze fixation of the eye gaze of the driver 108 of the ego vehicle 102 with respect to one or more objects 202, 204. This improvement to the computer and the technology provides electronic control of electronic components to improve driver situational awareness of particular objects and/or to account for the driver's predicted situational awareness of particular objects 202, 204 that may be provided in the form of autonomous control and/or electronic feedback by situationally and selectively providing smart driver-assistance human machine interfaces and/or electronic vehicle controls that pertain to and/or account the driver's predicted situational awareness of one or more objects 202, 204.

With continued reference to FIG. 1, the ECU 104 may be configured to be operably connected to a plurality of additional components of the ego vehicle 102, including the vehicle camera system 110, the eye gaze sensors 112, vehicle dynamic sensors 114, a storage unit 116, a vehicle autonomous controller 118, and vehicle systems/control units 120 of the ego vehicle 102. In one or more embodiments, the ECU 104 may include a microprocessor, one or more application-specific integrated circuit(s) (ASIC), or other similar devices. The ECU 104 may also include internal processing memory, an interface circuit, and bus lines for transferring data, sending commands, and communicating with the plurality of components of the ego vehicle 102.

The ECU 104 may also include a communication device (not shown) for sending data internally within (e.g., between one or more components) the ego vehicle 102 and communicating with externally hosted computing systems (e.g., external to the ego vehicle 102). Generally, the ECU 104 may communicate with the storage unit 116 to execute the one or more applications, operating systems, vehicle system and subsystem user interfaces, and the like that are stored within the storage unit 116. In one embodiment, the ECU 104 may communicate with the vehicle autonomous controller 118 to execute autonomous driving commands to operate the ego vehicle 102 to be fully autonomously driven or semi-autonomously driven in a particular manner. As discussed below, the autonomous driving commands may be based on commands provided by the situational awareness prediction application 106 to navigate the ego vehicle 102 within the driving scene 200 to autonomously control one or more functions of the ego vehicle 102 to account for the driver's predicted situational awareness at one or more future time steps with respect to respective dynamic objects 202 that are located within the driving scene 200 of the ego vehicle 102.

As discussed below, based on one or more executable command instructions that may be communicated by the situational awareness prediction application 106, the vehicle autonomous controller 118 may be configured to autonomously control the ego vehicle 102 to operate in a manner based on the one or more commands that are output by the situational awareness prediction application 106. As discussed, the situational awareness prediction application 106 may send autonomous control commands to the vehicle autonomous controller 118 to ensure that the ego vehicle 102 is autonomously operated to complete acceleration, braking, and/or steering in a way that accounts for dynamic objects 202 and/or static objects 204 that may be located at a relative position of the ego vehicle 102, that may require the ego vehicle 102 to modify its operation (e.g., by braking, turning, accelerating, etc.), and/or that may be associated with a lower predicted situational awareness of the driver 108.

The ECU 104 may also include a communication device (not shown) for sending data internally within (e.g., between one or more components) the ego vehicle 102 and communicating with externally hosted computing systems (e.g., external to the ego vehicle 102). Generally, the ECU 104 may communicate with the storage unit 116 to execute the one or more applications, operating systems, vehicle system and subsystem user interfaces, and the like that are stored within the storage unit 116.

In one embodiment, the ECU 104 may communicate with the vehicle autonomous controller 118 to execute autonomous driving commands to operate the ego vehicle 102 to be fully autonomously driven or semi-autonomously driven in a particular manner. As discussed below, the autonomous driving commands may be based on commands provided by the situational awareness prediction application 106 to navigate the ego vehicle 102 within the driving scene 200 to autonomously control one or more functions of the ego vehicle 102 to account for the one or more dynamic objects 202 and/or one or more static objects 204 located within the driving scene 200 that may be associated with a driver object awareness value that may be determined to be lower than a threshold value. As discussed below, the driver object awareness value may pertain to an aggregation of a driver's eye gaze fixation time and the predicted level of situational awareness that the driver 108 of the ego vehicle 102 may have with respect to dynamic objects 202 and static objects 204. In other words, the driver's real time eye gaze fixation in addition to object property based determinations of the SEEV framework may be combined to process the driver object awareness value associated with each object 202, 204. The driver object awareness value may thereby be used as an indicator to autonomously control one or more functions of the ego vehicle 102 to account for the one or more dynamic objects 202 and/or one or more static objects 204 located within the driving scene 200.

In one or more embodiments, the vehicle autonomous controller 118 may autonomously control the operation of the ego vehicle 102 by providing one or more commands to one or more of the vehicle systems/control units 120 to provide full autonomous or semi-autonomous control of the ego vehicle 102 to follow vehicle autonomous commands provided by the situational awareness prediction application 106. Such autonomous control of the ego vehicle 102 may be provided by sending one or more commands to control one or more of the vehicle systems/control units 120 to operate (e.g., drive) the ego vehicle 102 during one or more circumstances (e.g., when providing driver assist controls), and/or to fully control driving of the ego vehicle 102. For example, the vehicle autonomous controller 118 may operably control the vehicle systems/control units 120 of the ego vehicle 102 to autonomously operate the ego vehicle 102 according to the autonomous control commands to provide one or more driving maneuvers to account for the one or more objects 202, 204 that may be associated with a lower predicted situational awareness value, lower eye gaze fixation time, and/or a lower object awareness value of the driver 108 of the ego vehicle 102 at one or more points in time.

The one or more commands may be provided to one or more vehicle systems/control units 120 that include, but are not limited to a head unit, an engine control unit, a braking control unit, a transmission control unit, a steering control unit, and the like to control the ego vehicle 102 to be autonomously driven based on one or more autonomous commands that are output by the situational awareness prediction application 106. The one or more commands may also be provided to one or more vehicle systems/control units 120 that include one or more ADAS related systems and components to control the presentation of audio and visual alerts within the ego vehicle 102. Accordingly, the one or more vehicle systems/control units 120 may provide graphical visual alerts and/or audio alerts, autonomous control, and/or semi-autonomous control to assist in navigating the ego vehicle 102 within the driving scene 200 while accounting for one or more dynamic objects 202 and/or static objects 204 based on the predicted situational awareness value of the driver 108 and/or a lower eye gaze fixation value of the driver 108 of the ego vehicle 102.

With continued reference to FIG. 1, the vehicle camera system 110 may include one or more of the cameras (not shown) that may be positioned in one or more directions and at one or more areas to capture one or more images of the driving scene 200 of the ego vehicle 102 (e.g., images of the roadway on which the ego vehicle 102 is traveling). The one or more cameras of the vehicle camera system 110 may be disposed at external front portions of the ego vehicle 102, including, but not limited to different portions of a vehicle dashboard, a vehicle bumper, vehicle front lighting units, vehicle fenders, and a vehicle windshield. In one embodiment, the one or more cameras may be configured as RGB cameras that may capture RGB bands that are configured to capture rich information about object appearance, as well as relationships and interactions between the ego vehicle 102 and one or more objects 202, 204 within the driving scene 200 of the ego vehicle 102.

In other embodiments, the one or more cameras may be configured as stereoscopic cameras that are configured to capture environmental information in the form of three-dimensional images. In one or more configurations, the one or more cameras may be configured to capture one or more first person viewpoint RGB images/videos of the driving scene 200. The vehicle camera system 110 may be configured to convert one or more RGB images/videos (e.g., sequences of images) into driving scene data that is communicated to the situational awareness prediction application 106 to be analyzed. In one embodiment, the driving scene data provided by the vehicle camera system 110 may be communicated to the situational awareness prediction application 106 to be analyzed against the one or more object classifiers to classify dynamic objects 202 and static objects 204 captured within the driving scene data as located within the driving scene 200.

In an exemplary embodiment, the eye gaze sensors 112 may be configured as one or more cameras located within the ego vehicle 102 and hardware configured to interpret driving scene data sensed by the camera(s) to detect the driver's eye positions within the ego vehicle 102 in order to determine the driver's gaze points. In an alternate embodiment, the eye gaze sensors 112 may be included as part of a wearable device (e.g., wearable glasses) that may be configured to detect the driver's eye positions within the ego vehicle 102 in order to determine the driver's gaze points as the ego vehicle 102 is being operated within the driving scene 200. The driver's gaze points may pertain to a real-time gaze location of the driver 108 in a frame of reference of the driving scene 200.

As discussed below, the situational awareness prediction application 106 may be configured to analyze eye gaze data provided by the eye gaze sensors 112 against various areas of the driving scene 200. The situational awareness prediction application 106 may be further configured to compete eye gaze fixation identification with respect to each of the dynamic objects 202 and/or each of static objects 204 located within the driving scene 200 of the ego vehicle 102. The situational awareness prediction application 106 may be further be configured to evaluate the timeframe of the driver's eye gaze fixations upon each of the objects 202, 204 and may determine an eye gaze fixation value that may be pertain to a time of fixation that may be associated with each of the objects 202, 204.

In particular, the eye gaze fixation value may be determined as a numeric value (e.g., 0-10) that may pertain to a time of fixation that may be associated with each respective object 202, 204. In one embodiment, a null (0) eye gaze fixation value may be associated with objects 202, 204 that are not included within the eye gaze fixation of the driver 108 and higher values may be associated with objects 202, 204 that are included within the eye gaze fixation of the driver 108 as a time of fixation increases. Accordingly, a higher time of fixation for particular objects 202, 204 may be associated with higher eye gaze fixation values, whereas a lower time of fixation of particular objects 202, 204 may be associated with lower eye gaze fixation values.

With continued reference to FIG. 1, in one or more embodiments, the storage unit 116 of the ego vehicle 102 may be configured to store one or more executable files associated with one or more operating systems, applications, associated operating system data, application data, vehicle system and subsystem user interface data, and the like that are executed by the ECU 104. In one embodiment, the storage unit 116 may be configured to store eye gaze data and/or driving scene data that may be received by the situational awareness prediction application 106 at one or more points in time.

The situational awareness prediction application 106 may access the storage unit 116 to retrieve the eye gaze data and/or the driving scene data to classify dynamic objects 202 located within the driving scene 200, classify static objects 204 located within the driving scene 200, determine the relative positions of dynamic objects 202, 204 within the driving scene 200, determine the traffic density of the driving scene 200, and/or to complete fixation identification with respect to each of the dynamic objects 202 and/or each of static objects 204 located within the driving scene 200.

II. The Situational Awareness Prediction Application and Related Methods

Components of the situational awareness prediction application 106 will now be described according to an exemplary embodiment and with continued reference to FIG. 1. In an exemplary embodiment, the situational awareness prediction application 106 may be stored on the storage unit 116 and executed by the ECU 104 of the ego vehicle 102. In another embodiment, the situational awareness prediction application 106 may be stored on an externally hosted computing infrastructure and may be accessed by a telematics control unit of the ego vehicle 102 to be executed by the ECU 104 of the ego vehicle 102.

The general functionality of the situational awareness prediction application 106 will now be discussed. In an exemplary embodiment, the situational awareness prediction application 106 may include a plurality of modules 122-128 that may be configured to provide a situational awareness based adaptive driver vehicle interface. The plurality of modules 122-128 may include a driving scene determinant module 122, a fixation time determinant module 124, a situational awareness prediction module 126, and a vehicle control module 128. However, it is appreciated that the situational awareness prediction application 106 may include one or more additional modules and/or sub-modules that are included in lieu of the modules 122-128.

Figure 3:
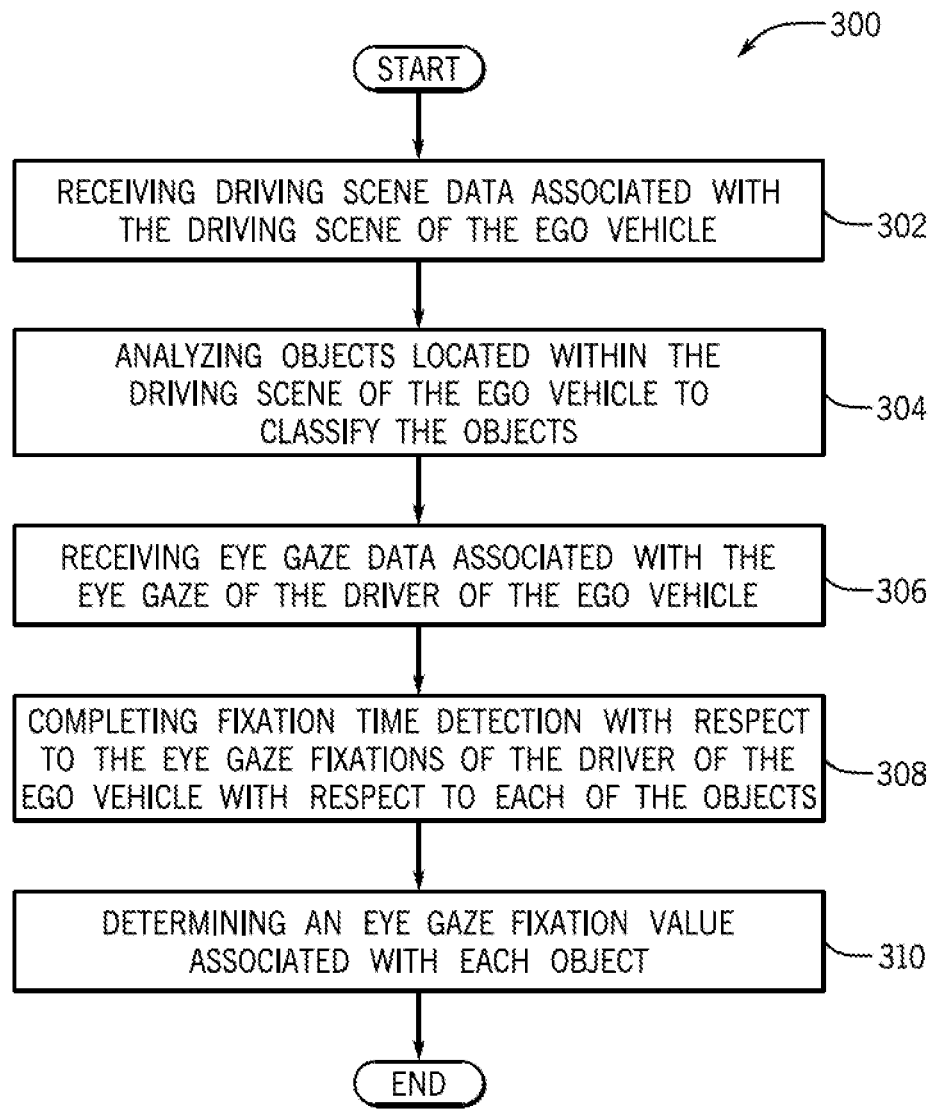
FIG. 3 is a process flow diagram of a method for determining an eye gaze fixation value associated with each of the objects that are located within the driving scene of the ego vehicle according to an exemplary embodiment of the present disclosure.

FIG. 3 is a process flow diagram of a method 300 for determining an eye gaze fixation value associated with each of the objects 202, 204 that are located within the driving scene 200 of the ego vehicle 102 according to an exemplary embodiment of the present disclosure. FIG. 3 will be described with reference to the components of FIG. 1 though it is to be appreciated that the method 300 of FIG. 3 may be used with other systems/components. The method 300 may begin at block 302, wherein the method 300 may include receiving driving scene data associated with the driving scene 200 of the ego vehicle 102.

In one embodiment, the driving scene determinant module 122 of the situational awareness prediction application 106 may be configured to communicate with the vehicle camera system 110 to collect dynamic scene data associated with untrimmed images/video of the driving scene 200 of the ego vehicle 102. In some configurations, the driving scene data may pertain to one or more first person viewpoint RGB images/videos of the driving scene 200 of the ego vehicle 102. In particular, the driving scene data may pertain to one or more RGB images/video of the surrounding dynamic objects 202 and static objects 204 that are located within the driving scene 200 that are captured by one or more cameras that are operably connected to the vehicle camera system 110. In some embodiments, the driving scene determinant module 122 may package and store the driving scene data on the storage unit 116 to be evaluated at one or more points in time. The driving scene determinant module 122 may additionally communicate the driving scene data to the fixation time determinant module 124 and the situational awareness prediction module 126 of the situational awareness prediction application 106.

The method 300 may begin at block 304, wherein the method 300 may include analyzing objects 202, 204 located within the driving scene 200 of the ego vehicle 102 to classify the objects 202, 204. In an exemplary embodiment, the driving scene determinant module 122 may be configured to analyze driving scene data using artificial intelligence capabilities to compare driving scene data against one or more object classifiers that may be stored upon the storage unit 116 of the ego vehicle 102.

In particular, the driving scene determinant module 122 may be configured to access the storage unit 116 of the ego vehicle 102 to analyze one or more object classifiers that are stored upon the storage unit 116. The one or more object classifiers may include pre-trained object classification data that may be associated with aggregated image coordinates that may pertain to specific types of static objects 204 (e.g., trees, street signs, traffic signals, poles, guard rails, etc.) and specific types of dynamic objects 202 (e.g., cars, trucks, pedestrians, bicyclists, etc.) to classify the dynamic objects 202 and the static objects 204 that are located within the driving scene 200 of the ego vehicle 102.

More specifically, the driving scene determinant module 122 may be configured to analyze the driving scene data to extract image coordinates that may pertain to each of the dynamic objects 202 and each of the static objects 204 that are captured as being located within the driving scene 200. The driving scene determinant module 122 may be configured to analyze the driving scene data and may compute bounding boxes around each of the objects 202, 204 located within the image(s) as captured by the vehicle camera system 110. Upon the processing of bounding boxes around each of the objects 202, 204, the driving scene determinant module 122 may be configured to analyze the one or more object classifiers to compare the objects 202, 204 included within the bounding boxes against the pre-trained object classification data to thereby classify the objects 202, 204 as specific types of dynamic objects 202 and specific types of static objects 204 that are located within the driving scene 200 of the ego vehicle 102.

The driving scene determinant module 122 may also be configured to execute image logic to determine additional physical characteristics that may pertain to color, shape, size, and/or identification of specific features to identify traffic signals, street signage, vehicle color, and/or additional physical characteristics that may be associated with each of the dynamic objects 202 and/or each of the static objects 204 that may be located within the driving scene 200. In some configurations, the driving scene determinant module 122 may also be configured to analyze the driving scene data to determine relative positional coordinates that pertain to a relative position of each of the dynamic objects 202 and each of the static objects 204 that are located within the driving scene 200 with respect to the real-time position of the ego vehicle 102.

The method 300 may proceed to block 306, wherein the method 300 may include receiving eye gaze data associated with the eye gaze of the driver 108 of the ego vehicle 102. In an exemplary embodiment, the driving scene determinant module 122 may be configured to communicate the driving scene data associated with the driving scene 200 to the fixation time determinant module 124 of the situational awareness prediction application 106. In one configuration, the fixation time determinant module 124 may be configured to communicate with the eye gaze sensors 112 of the ego vehicle 102 to receive eye gaze data associated with the eye gaze of the driver 108 of the ego vehicle 102 (e.g., received for a period of time during which the dynamic objects 202 and the static objects 204 have been classified by the driving scene determinant module 122).

As discussed, the eye gaze sensors 112 may be configured as one or more cameras and hardware that may be configured to interpret video or driving scene data sensed by the camera(s) to detect the driver's eye positions within the ego vehicle 102 in order to determine the driver's gaze points. In an alternate embodiment, the eye gaze sensors 112 may be included as part of a wearable device that may be configured to detect the driver's eye positions within the ego vehicle 102 in order to determine the driver's gaze points as the ego vehicle 102 is being operated within the driving scene 200.

The method 300 may proceed to block 308, wherein the method 300 may include completing fixation time detection with respect to the eye gaze fixations of the driver 108 of the ego vehicle 102 with respect to each of the objects 202, 204. In an exemplary embodiment, the fixation time determinant module 124 may be configured to analyze the eye gaze data communicated by the eye gaze sensors 112 of the ego vehicle 102 along with the driving scene data that may be based on the image(s) captured of the driving scene 200 by the vehicle camera system 110. In one configuration, the fixation time determinant module 124 may be configured to extract eye gaze coordinates and may analyze the eye gaze coordinates against various areas of the driving scene 200 captured within the driving scene data.

In an exemplary embodiment, the fixation time determinant module 124 may perform a calibration between the driving scene data and the eye gaze data. Since the raw gaze coordinates provided by the eye gaze sensors 112 are normalized values, the fixation time determinant module 124 may be configured to transfer the values in pixels based on the dimension of the images of the driving scene 200 as included within the driving scene data provided by the vehicle camera system 110. Accordingly, the fixation time determinant module 124 may be configured to analyze driving scene data associated with image(s) of the driving scene 200 and eye gaze coordinates extracted from eye gaze data that are associated with matching time steps (e.g., at a simultaneous point in time) to identify a correspondence between various portions of the driving scene 200 and the driver's real-time eye gaze as the driver 108 views the driving scene 200 (e.g., through a windshield of the ego vehicle 102 during operation of the ego vehicle 102).

In one embodiment, the fixation time determinant module 124 may be configured to complete fixation identification by analyzing time coordinates associated with a time of fixation of the driver's eye gaze with respect to different portions of the driving scene 200. Upon analyzing the time of fixation that pertains to different portions of the driving scene 200, the fixation time determinant module 124 may be configured to label each of the objects 202, 204 that may be located within the driving scene 200 with a time of fixation of the driver's eye gaze with respect to each respective object 202, 204. Accordingly, objects 202, 204 that may not fall within the eye gaze fixation of the driver 108 may not be labeled with a time of fixation of the driver's eye gaze. Additionally, objects 202, 204 that do fall within the eye gaze fixation of the driver 108 may be accordingly labeled with a respective time of fixation of the driver's eye gaze.

The method 300 may proceed to block 310, wherein the method 300 may include determining an eye gaze fixation value associated with each object 202, 204. In an exemplary embodiment, the fixation time determinant module 124 may process the time of fixation of the driver's eye gaze with respect to each of the objects 202, 204 into an eye gaze fixation value. As discussed, the eye gaze fixation value may be determined as a numeric value (e.g., 0-10) that may pertain to the time of fixation that may be associated with each respective object 202, 204. In one embodiment, the fixation time determinant module 124 may assign objects 202, 204 that are not included within the eye gaze fixation of the driver 108 with a null (0) eye gaze fixation value.

The fixation time determinant module 124 may further analyze the time of fixation associated with each of the objects 202, 204 and may assign values that correspond to the labeled time of fixation with respect to each of the objects 202, 204 based on a comparison of a spectrum/range of the times of fixation associated with each of the objects 202, 204 that are located within the driving scene 200. Accordingly, the fixation time determinant module 124 may assign lower eye gaze fixation values to one or more objects 202, 204 that that are included within a lower spectrum/range of lower times of eye gaze fixation of the driver 108. The fixation time determinant module 124 may also assign higher eye gaze fixation values to one or more objects 202, 204 that are within a higher spectrum/range of higher times of fixation of the driver 108.

Stated differently, the eye gaze fixation values may be commensurate with the time of fixation associated with each of the objects 202, 204 based on a range of time of fixation associated with all of the objects 202, 204 included within the driving scene 200. For example, one or more objects 202, 204 that may be associated with a higher times of fixation of the driver 108 as compared to additional objects 202, 204 may be assigned with higher (e.g., 7-10) eye gaze fixation values, whereas one or more objects 202, 204 that may be associated with a lower time of fixation of the driver 108 as compared to additional objects 202, 204 may be assigned with lower (e.g., 1-4) eye gaze fixation values.

Also, as discussed above, objects 202, 204 that are not included within the eye gaze fixation of the driver 108 may be assigned a null (0) eye gaze fixation value. In one embodiment, upon determining the eye gaze fixation value associated with each object 202, 204 located within the driving scene 200, the fixation time determinant module 124 may communicate data associated with the eye gaze fixation value associated with each object 202, 204 and related eye gaze data to the situational awareness prediction module 126 and the vehicle control module 128 of the situational awareness prediction application 106.

Figure 4:
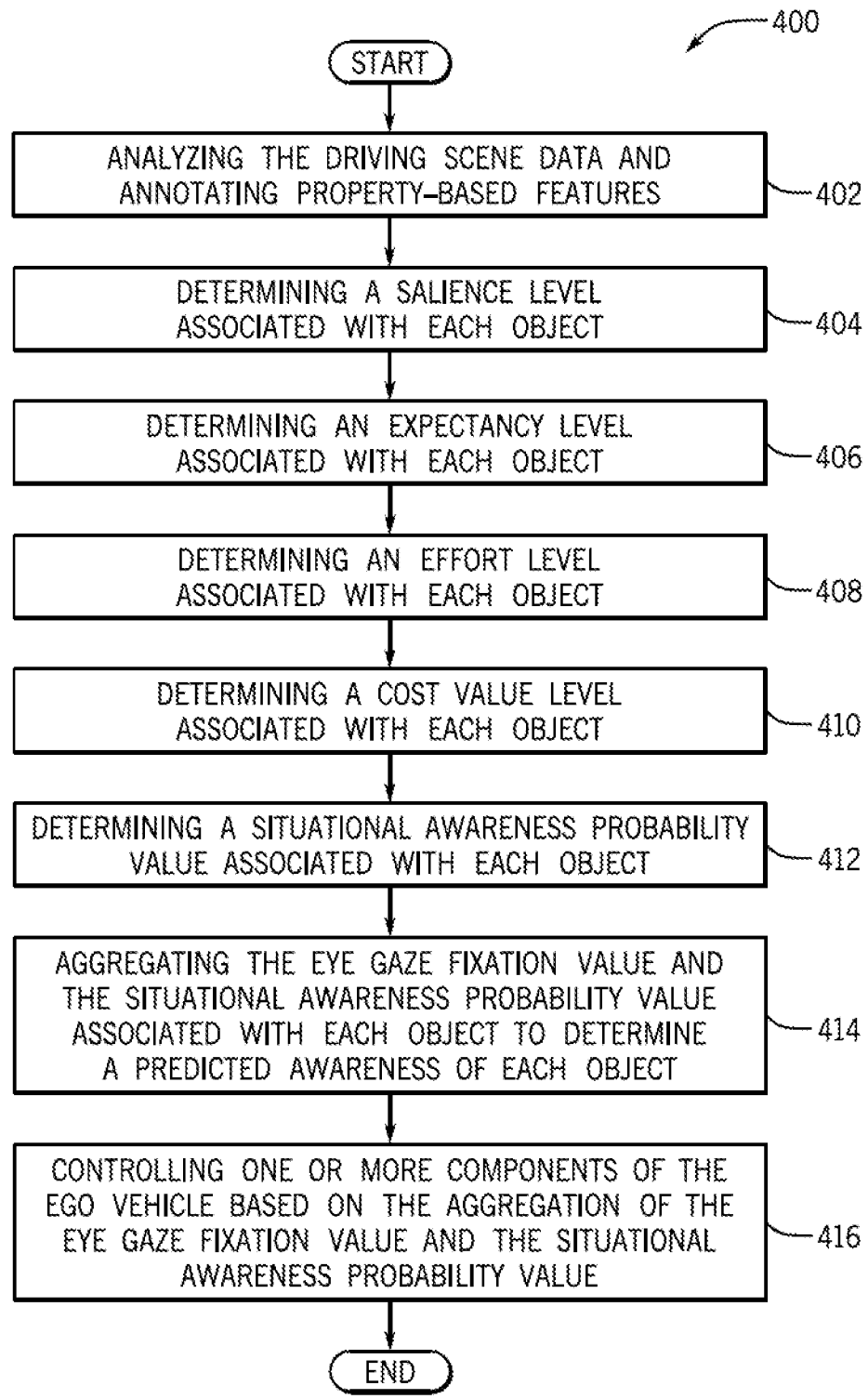
FIG. 4 is a process flow diagram of a method for determining a situational awareness probability value associated with each object and controlling one or more components of the ego vehicle based on the eye gaze fixation value and the situational awareness probability value according to an exemplary embodiment of the present disclosure.

FIG. 4 is a process flow diagram of a method 400 for determining a situational awareness probability value associated with each object 202, 204 and controlling one or more components of the ego vehicle 102 based on the eye gaze fixation value and the situational awareness probability value according to an exemplary embodiment of the present disclosure. FIG. 4 will be described with reference to the components of FIG. 1 though it is to be appreciated that the method 400 of FIG. 4 may be used with other systems/components. The method 400 may begin at block 402, wherein the method 400 may include analyzing the driving scene data and annotating property-based features.

In an exemplary embodiment, the situational awareness prediction module 126 may be configured to analyze the driving scene data of the driving scene 200 at a respective timeframe at which the eye faze fixations of the driver 108 have been captured to extract object property-based features associated with the objects 202, 204 located within the driving scene 200 of the ego vehicle 102. In one configuration, the situational awareness prediction module 126 may be configured to access the storage unit 116 of the ego vehicle 102 to analyze one or more object-based feature classifiers that are stored upon the storage unit 116. The one or more object-based feature classifiers may include pretrained object-based feature classification data that may be associated with various features that may pertain to physical, dynamic, and relative property-based features of each dynamic object 202 and/or each static object 204 that is located within the driving scene 200.

In one embodiment, upon analyzing the driving scene data with respect to the object-based feature classifiers, the situational awareness prediction module 126 may be configured to extract and output object property-based features that include, but may not be limited to, object contrast, object movement, object relevance, object priority, object size, and object proximity. In particular, the situational awareness prediction module 126 may be configured to extract an object contrast property-based feature that may pertain to a static salience associated with each respective object 202, 204 against a background of the driving scene 200. The static salience may pertain to a measure of noticeability and/or prominence with an attention capturing effect each object 202, 204 during a static state of non-movement of one or more objects 202, 204 and/or non-movement of the ego vehicle 102 with respect to an attention capturing effect of each respective object 202, 204 to the driver 108 of the ego vehicle 102 within the driving scene 200. In one configuration, the contrast property-based feature may be output as a value (e.g., 1, 2, 3) or an annotated description (e.g., low, medium, high) that may pertain to the measure of static salience with respect to each object 202, 204 located within the driving scene 200.

The situational awareness prediction module 126 may also be configured to extract a movement property-based feature. The movement property-based feature may pertain to a dynamic salience of information associated with each dynamic object 202, 204 against a background of the driving scene 200. The dynamic salience may pertain to a measure of noticeability and/or prominence of each object 202, 204 during a static state of movement of one or more objects 202, 204 and/or movement of the ego vehicle 102 with respect to an attention capturing effect of each respective object 202, 204 to the driver 108 of the ego vehicle 102 within the driving scene 200. In one configuration, the movement property-based feature may be output as a value (e.g., 1, 2, 3) or an annotated description (e.g., low, medium, high) that may pertain to the measure dynamic salience with respect to each object 202, 204 located within the driving scene 200.

As discussed above, the driving scene determinant module 122 may be configured to analyze the driving scene data to determine relative positional coordinates that pertain to a relative position of each of the dynamic objects 202 and each of the static objects 204 that are located within the driving scene 200 with respect to the real-time position of the ego vehicle 102. The situational awareness prediction module 126 may also be configured to extract a relevance property-based feature. In one embodiment, the relevance property-based feature may pertain to a value of processing information measured by a movement and/or a position of each object 202, 204 relative to the ego vehicle 102 based on the relative positional coordinates determined by the driving scene determinant module 122. In one configuration, the relevance property-based feature may be output as a value (e.g., 0, 1) or an annotated description (e.g., no, heading into/on the path) that may pertain to a likelihood of overlap between the projected path of the ego vehicle 102 and the projected path and/or position of one or more objects 202, 204.

As discussed above, the driving scene determinant module 122 may be configured classify the objects 202, 204 as specific types of dynamic objects 202 and specific types of static objects 204 that are located within the driving scene 200 of the ego vehicle 102. In one embodiment, the situational awareness prediction module 126 may additionally be configured to extract a priority property-based feature. The priority property-based feature may pertain to a cost of missing information measure that may be associated with the object classification of each object 202, 204. In particular, the priority property-based feature may pertain to a cost that may be associated with a likelihood of overlap with respect to the ego vehicle 102 and the position of one or more objects 202, 204 that may result based on the driver 108 missing/not attending to one or more respective objects 202, 204 within the driving scene 200. In one configuration, the priority property-based feature may be output as a value (e.g., 1, 2) and/or an annotated description (e.g., vehicle, pedestrian) that may pertain a cost that may be associated with a likelihood of overlap with respect to the ego vehicle 102 and the position of one or more objects 202, 204 and/or an object classification of each respective object 202, 204.

As discussed above, the driving scene determinant module 122, may also be configured to determine additional physical characteristics that may pertain to color, shape, size, and/or identification of specific features to identify traffic signals, street signage, vehicle color, and/or additional physical characteristics that may be associated with each of the dynamic objects 202 and static objects 204 that may be located within the driving scene 200. In one or more embodiments, the situational awareness prediction module 126 may be configured to extract a size property-based feature. The size property-based feature may pertain to a distance from the ego vehicle 102 to each respective object 202, 204 approximated by the relative height of each respective object 202, 204. In one configuration, the size property-based feature may be normalized to a range of values. For example, the size property-based feature may be normalized to a range of 0-1.

In one embodiment, based on an analysis of the relative positional coordinates that pertain to a relative position of each of the dynamic objects 202 and each of the static objects 204 that are located within the driving scene 200 with respect to the real-time position of the ego vehicle 102, the situational awareness prediction module 126 may be configured to extract a proximity property-based feature. The proximity property-based feature may pertain to a degree of angular distance between the heading of the ego vehicle 102 and the position of each of the objects 202, 204 located within the driving scene 200. The proximity property-based feature may be based on a steering angle of the ego vehicle 102 that may pertain to an ego vehicle heading and rotation as determined based on data provided by the vehicle dynamic sensors 114 of the ego vehicle 102. In one configuration, the proximity property-based feature may be output as a degree value that pertains to a degree of angular distance between the heading and rotation of the ego vehicle 102 and the position of each of the objects 202, 204 located within the driving scene 200.

With continued reference to FIG. 4, the method 400 may proceed to block 404, wherein the method 400 may include determining a salience level associated with each object 202, 204. In an exemplary embodiment, the situational awareness prediction module 126 may be configured to analyze one or more of the object property-based features associated with the objects 202, 204 located within the driving scene 200 of the ego vehicle 102 to determine the salience level that may be associated with properties of each respective object 202, 204. In one configuration, the situational awareness prediction module 126 may be configured to specifically analyze the object contrast property-based feature that may pertain to a static salience associated with each respective object 202, 204 against a background of the driving scene 200 in addition to the movement property-based feature that may pertain to a dynamic salience of information associated with each dynamic object 202, 204 against a background of the driving scene 200 to determine the salience level associated with each object 202, 204 located within the driving scene 200. In addition, the situational awareness prediction module 126 may be configured to analyze the size property-based feature that pertains to a distance from the ego vehicle 102 to each respective object 202, 204 approximated by the relative height of each respective object 202, 204.

In one embodiment, the situational awareness prediction module 126 may be configured to weigh the values associated with the object contrast property-based feature, the movement property-based feature, and the size property-based feature based on a relative position of each of the dynamic objects 202 and static objects 204 with respect to the position of the ego vehicle 102 and relative movement of the ego vehicle 102 with respect to the position of each of the objects 202, 204 to determine the salience level associated with each respective object 202, 204 located within the driving scene 200 of the ego vehicle 102. Accordingly, the salience level may be output as a value (e.g., 1, 2, 3) or an annotated description (e.g., low, medium, high) that pertains to a likelihood that objects capture an attention of the driver 108 of the ego vehicle 102 and/or as a product of object contrast against a background of the driving scene 200.

The method 400 may proceed to block 406, wherein the method may include determining an expectancy level associated with each object 202, 204. In an exemplary embodiment, the situational awareness prediction module 126 may be configured to analyze one or more of the object property-based features associated with the objects 202, 204 located within the driving scene 200 of the ego vehicle 102 to determine the expectancy level may be associated with a respective location of each object 202, 204 within a field of view of the driver 108 of the ego vehicle 102. In one configuration, the situational awareness prediction module 126 may be configured to specifically analyze the relevance property-based feature pertaining to relative positional coordinates that pertain to a relative position of each of the dynamic objects 202 and each of the static objects 204 that are located within the driving scene 200 with respect to the real-time position of the ego vehicle 102. As discussed, the relevance property-based feature may pertain to a value of processing information measured by a movement and/or a position of each object 202, 204 relative to the ego vehicle 102 based on the relative positional coordinates determined by the driving scene determinant module 122.

In some embodiments, in addition to the relevance property-based feature, the situational awareness prediction module 126 may additionally communicate with the fixation time determinant module 124 to determine the eye gaze fixation value associated with each object 202, 204 (as determined at block 310 of the method 300). The situational awareness prediction module 126 may be configured to aggregate data associated with the relevance property-based feature and the eye gaze fixation value associated with each of the objects 202, 204 to determine the expectancy level associated with each object 202, 204. The expectancy level may be output as a value (e.g., 1, 2, 3) or an annotated description (e.g., low, medium, high) with respect to the respective position of each object 202, 204 as compared to the respective position of the ego vehicle 102 and/or as a product of the eye gaze fixation of the driver 108 of the ego vehicle 102 at a particular point in time with respect to each respective object 202, 204 located within the driving scene 200.

The method 400 may proceed to block 408, wherein the method 400 may include determining an effort level associated with each object 202, 204. In an exemplary embodiment, the situational awareness prediction module 126 may be configured to analyze one or more of the object property-based features associated with the objects 202, 204 located within the driving scene 200 of the ego vehicle 102 to determine the effort level associated with each object 202, 204. In one configuration, the situational awareness prediction module 126 may be configured to specifically analyze the priority property-based feature pertaining to a cost that may be associated with a likelihood of overlap with respect to the ego vehicle 102 and the position of one or more objects 202, 204 that may result based on the driver 108 missing/not attending to one or more respective objects 202, 204 within the driving scene 200 in addition to the relevance property-based feature pertaining to relative positional coordinates that pertain to a relative position of each of the objects 202, 204 that are located within the driving scene 200 with respect to the real-time position of the ego vehicle 102 to determine the effort level associated with each object 202, 204.

In particular, the situational awareness prediction module 126 may be configured weigh data associated with the priority property-based feature and the relevance property-based feature associated with each object to determine the effort level associated with each object 202, 204 based on an object density of the driving scene 200. Accordingly, the effort level may be output as a value (e.g., 1, 2, 3) or an annotated description (e.g., low, medium, high) with respect a level of effort that is involved with respect to the driver 108 attending to various different objects, referred to the attention travel over different objects 202, 204 and/or an object density of the driving scene 200. Stated differently, the effort level that is involved in the attention travel over different objects 202, 204 may be determined as level that may be commensurate to an object density, relative position, and cost that may be associated with a likelihood of overlap with respect to the ego vehicle 102 and the position of one or more objects 202, 204.

The method 400 may proceed to block 410, wherein the method 400 may include determining a cost value level associated with each object 202, 204. In an exemplary embodiment, the situational awareness prediction module 126 may be configured to analyze one or more of the object property-based features associated with the objects 202, 204 located within the driving scene 200 of the ego vehicle 102 to determine the cost value level associated with each object 202, 204. In one configuration, the situational awareness prediction module 126 may be configured to specifically analyze the priority property-based feature pertaining to a cost that may be associated with a likelihood of overlap with respect to the ego vehicle 102 and the position of one or more objects 202, 204 that may result based on the driver 108 missing/not attending to one or more respective objects 202, 204 within the driving scene 200 in addition to the proximity property-based feature may pertain to a degree of angular distance between the heading and rotation of the ego vehicle 102 and the position of each of the objects 202, 204 located within the driving scene 200 to determine the cost value level associated with each object 202, 204. The situational awareness prediction module 126 may also be configured to specifically analyze the classification of each of the objects 202, 204 (as classified at block 304 of the method 300) to determine the cost value level associated with each object 202, 204.

In particular, the situational awareness prediction module 126 may be configured to analyze and weigh the values associated with the priority property-based feature and the proximity property-based feature associated with each of the objects 202, 204 based on a classification of each of the objects 202, 204, the relative position of each of the objects 202, 204 with respect to the position of the ego vehicle 102, and a relative movement of the ego vehicle 102 with respect to the position of each of the objects 202, 204 to determine the cost value level. The cost value level may be determined as a product of relevance and priority of each object 202, 204 with respect to a cost of missing information associated with each object 202, 204 during an operation of the ego vehicle 102. In one embodiment, the cost value level may be determined as a value that is representative of cost of missing information associated with each object 202, 204 that may be based on a classification of each object 202, 204 and/or a potential likelihood of overlap between a projected path of each respective object 202, 204 and a projected path of the ego vehicle 102 within the driving scene 200.

With continued reference to FIG. 4, the method 400 may proceed to block 412, wherein the method 400 may include determining a situational awareness probability value associated with each object 202, 204. In an exemplary embodiment, the situational awareness prediction module 126 may be configured to analyze the salience level, expectancy level, effort level, and the cost value level (as determined at blocks 404-410) and may be configured to normalize each of the levels of the SEEV framework. Upon normalization of the levels, the situational awareness prediction module 126 may be configured to determine the situational awareness probability value P(A) as linear weighted combination of the features of the SEEV framework. Accordingly, the situational awareness probability value P(A) associated with each object 202, 204 may be determined as a linear weighted combination of the salience level, expectancy level, effort level, and the cost value level and may be represented as:

$$P(A)=\beta_0+\beta_1\times S+2\times EX+\beta_3\times EF+\beta_4\times V$$

In some embodiments, the salience level S is indicative of the properties of each of the objects 202, 204 and represents the likelihood that respective objects 202, 204 capture the attention of the driver 108 of the ego vehicle 102. The effort level EF is indicative of the effort involved in attention travel over different objects 202, 204. The expectancy level EF is based on each object's location in the field of view of the driver 108 of the ego vehicle 102. Additionally, the cost value V is represented as the product of relevance and priority of each object 202, 204 that is located within the driving scene 200.

In an exemplary embodiment, the situational awareness prediction module 126 may be configured to output the situational awareness probability value P(A) as a numeric value (e.g., 0-10) that may pertain to a predicted level of situational awareness that a driver 108 of the ego vehicle 102 may have with respect to dynamic objects 202 and static objects 204 at one or more future time steps (t+1, t+2, t+n) based on the object-based properties of the objects 202, 204.

The method 400 may proceed to block 414, wherein the method 400 may include aggregating the eye gaze fixation value and the situational awareness probability value associated with each object 202, 204 to process a driver object awareness value associated with each object 202, 204. In an exemplary embodiment, the situational awareness prediction module 126 may be configured to aggregate the eye gaze fixation value associated with each respective object 202, 204 with the situational awareness probability value associated with each object 202, 204 to process a driver object awareness value associated with each object 202, 204. The driver object awareness value may pertain to the driver's eye gaze fixation time and the predicted level of situational awareness that a driver 108 of the ego vehicle 102 may have with respect to dynamic objects 202 and static objects 204. In other words, the driver's real time eye gaze fixation in addition to object based determinations of the SEEV framework may be combined to process the driver object awareness value associated with each object 202, 204.

In an exemplary embodiment, upon determining the driver object awareness value associated with each object 202, 204, the situational awareness prediction module 126 may be configured to process a driver object awareness threshold value that may subjectively apply to situational attributes that may be associated with the operation of the ego vehicle 102, the driving scene 200, and/or driving conditions of the driving scene 200 at a particular point in time. In particular, the situational awareness prediction module 126 may be configured to process the driver object awareness threshold value as a dynamic value that may change at particular time steps based on the particular vehicle dynamics of the ego vehicle 102 (e.g., speed, braking, steering angle, etc.), the type of driving scene 200 of the ego vehicle 102 (e.g., highway, intersection, two-lane road, off-ramp), and/or the driving conditions (e.g., weather, traffic density, road conditions) of the driving scene 200 of the ego vehicle 102.

Upon processing the driver object awareness threshold value, the situational awareness prediction module 126 may be configured to compare the driver object awareness value associated to each of the objects 202, 204 to the processed driver object awareness threshold value to determine if the driver 108 has a lower driver awareness with respect to any of the objects 202, 204 within the driving scene 200 than the driver object awareness threshold value. If it is determined that the driver 108 has a lower driver awareness that pertains to the presence of particular objects 202, 204 within the driving scene 200, the situational awareness prediction module 126 may determine and output data associated with the classification, position, locations, and attributes associated with one or more objects 202, 204 that are associated with the lower level of driver awareness than the driver awareness threshold value to the vehicle control module 128 of the situational awareness prediction application 106.

The method 400 may proceed to block 416, wherein the method 400 may include controlling one or more components of the ego vehicle 102 to account for objects 202, 204 that are associated with a lower level of driver awareness. In an exemplary embodiment, upon receiving data associated with the classification, position, locations, and attributes associated with one or more dynamic objects 202, 204 that are associated with the lower driver awareness than the driver awareness threshold value, the vehicle control module 128 may be configured to analyze the data and output one or more commands to the vehicle systems/control units 120 to control one or more operations of one or more components of the ego vehicle 102.

In some embodiments, the vehicle control module 130 may be configured to output vehicle autonomous commands that may be associated with driving parameters to autonomously control the operation of the ego vehicle 102 to account for one or more objects 202, 204 that may be located at a relative predetermined position of the ego vehicle 102, that may be located within a projected pathway of the ego vehicle 102, and that may be associated with the lower driver awareness of the driver 108 of the ego vehicle 102. In one configuration, the vehicle control module 130 may be configured to communicate the autonomous control commands to the vehicle autonomous controller 118 to operably control the vehicle systems/control units 120 of the ego vehicle 102 to autonomously operate the ego vehicle 102 according to the autonomous control commands to provide one or more driving maneuvers to account for the one or more objects 202, 204 that may be located at a relative predetermined position of the ego vehicle 102, that may be located within a projected pathway of the ego vehicle 102, and that may be associated with the lower driver awareness of the driver 108.

In one embodiment, the vehicle control module 128 may be additionally or alternatively be configured to send one or more commands to the vehicle systems/control units 120 to operably control the head unit of the ego vehicle 102 which include one or more display devices to situationally and selectively utilize ADAS within the ego vehicle 102. In particular, the use of ADAS may be used to alert the driver 108 of one or more objects 202, 204 that may be located at a relative predetermined position of the ego vehicle 102, that may be located within a projected pathway of the ego vehicle 102, and that may be associated with the lower driver awareness of the driver 108.

In one configuration, upon determining a lower level of driver awareness with respect to one or more particular objects 202, 204 by the situational awareness prediction module 126, the vehicle control module 128 may be configured to operably control situational utilization of the ADAS of the ego vehicle 102 to provide one or more alerts and/or warnings that may pertain to the presence and/or positions of one or more objects 202, 204 that may be associated with a lower level of driver awareness which may enhance a level of the driver's awareness to those objects 202, 204. Additionally, objects 202, 204 that may not be included within a long duration of the driver's eye gaze and/or may not include object based properties that may not be predicted to capture the situational awareness of the driver 108 at one or more future time steps may be brought to the attention of the driver 108 and/or may be accounted for during an autonomous or semi-autonomous operation of the ego vehicle 102.

Figure 5:
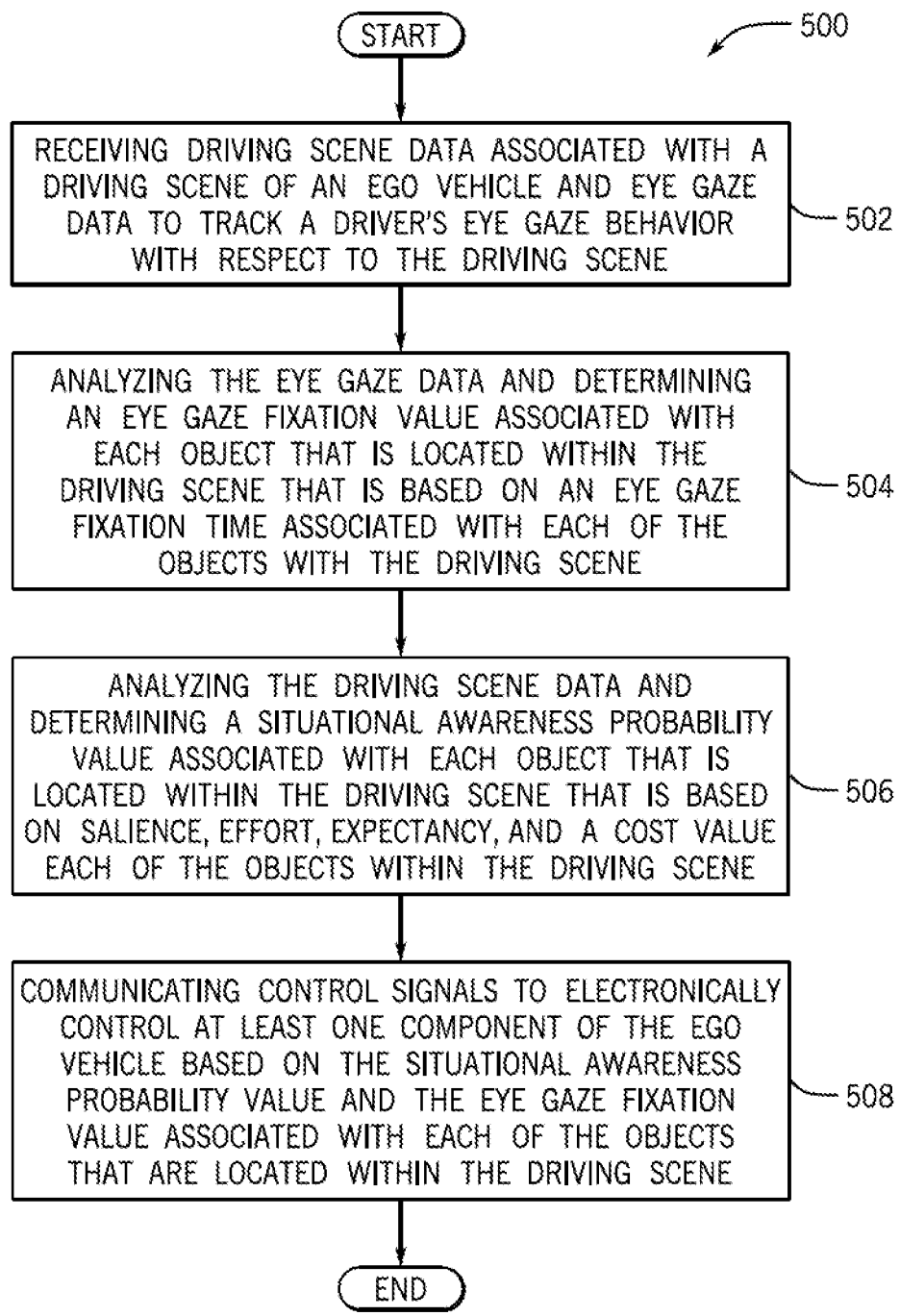
FIG. 5 is a process flow diagram of a method for predicting a driver's situational awareness according to an exemplary embodiment of the present disclosure.

FIG. 5 is a process flow diagram of a method 500 for predicting a driver's situational awareness according to an exemplary embodiment of the present disclosure. FIG. 5 will be described with reference to the components of FIG. 1 though it is to be appreciated that the method 500 of FIG. 5 may be used with other systems/components. The method 500 may begin at block 502, wherein the method 500 includes receiving driving scene data associated with a driving scene 200 of an ego vehicle 102 and eye gaze data to track a driver's eye gaze behavior with respect to the driving scene 200.

The method 500 may proceed to block 504, wherein the method 500 may include analyzing the eye gaze data and determining an eye gaze fixation value associated with each object 202, 204 that is located within the driving scene 200 that is based on an eye gaze time fixation associated with each of the objects within the driving scene 200. The method 500 may proceed to block 506, wherein the method 500 may include analyzing the driving scene data and determining a situational awareness probability value associated with each object 202, 204 that is located within the driving scene 200 that is based on a salience, effort, expectancy, and a cost value each of the objects within the driving scene 200. The method 500 may proceed to block 508, wherein the method 500 includes communicating control signals to electronically control at least one component of the ego vehicle 102 based on the situational awareness probability value and the eye gaze fixation value associated with each of the objects 202, 204 that are located within the driving scene 200.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A computer-implemented method for predicting a driver's situational awareness comprising:
receiving driving scene data associated with a driving scene of an ego vehicle and eye gaze data to track a driver's eye gaze behavior with respect to the driving scene;
analyzing the eye gaze data and determining an eye gaze fixation value for each and every object that is located within the driving scene based on an eye gaze fixation time for each of the objects within the driving scene, wherein determining the eye gaze fixation value includes establishing a global range of eye gaze fixation times for all objects within the driving scene, the global range comprising a global minimum and maximum fixation time across the objects present in the driving scene, computing the eye gaze fixation value for each of the objects within the driving scene by scaling that object's eye gaze fixation time with respect to the global range, and assigning a zero eye gaze fixation value to each object in the driving scene that is not intersected by the driver's gaze, thereby ensuring that all objects are represented in the comparative analysis;
analyzing the driving scene data and determining a situational awareness probability value associated with each object that is located within the driving scene that is based on a salience, effort, expectancy, and a cost value associated with each of the objects within the driving scene; and
communicating control signals to electronically control at least one component of the ego vehicle based on the situational awareness probability value and the eye gaze fixation value associated with each of the objects that are located within the driving scene.

2. The computer-implemented method of claim 1, wherein analyzing the eye gaze data and determining the eye gaze fixation value includes extracting eye gaze coordinates from the eye gaze data and analyzing the driving scene data and the eye gaze coordinates that are associated with matching time steps to identify a correspondence between various portions of the driving scene and the driver's eye gaze behavior.

3. The computer-implemented method of claim 2, wherein analyzing the eye gaze data and determining the eye gaze fixation value includes analyzing time coordinates associated with the eye gaze fixation time of the driver's eye gaze behavior with respect to different portions of the driving scene and labeling each object with the eye gaze fixation time of the driver's eye gaze behavior that are included within respective different portions of the driving scene, wherein the eye gaze fixation value is determined as a numerical value that pertains to a labeled eye gaze fixation time with respect to each object, and the eye gaze fixation value and the situational awareness probability value are aggregated to process a driver object awareness value which pertains to the driver's eye gaze fixation time and a predicted level of situational awareness that the driver of the ego vehicle has with respect to each of the objects that are located within the driving scene.

4. The computer-implemented method of claim 1, wherein analyzing the driving scene data and determining the situational awareness probability value includes analyzing the driving scene data at a respective timeframe at which eye gaze fixations of the driver have been captured to extract object property-based features associated with each object located within the driving scene.

5. The computer-implemented method of claim 4, wherein the object property-based features associated with each object located within the driving scene include at least one of: object contrast, object movement, object relevance, object priority, object size, and object proximity.

6. The computer-implemented method of claim 5, wherein determining the situational awareness probability value associated with each object that is located within the driving scene includes determining a salience level that is related to the salience associated with each of the objects based on an analysis of the object property-based features, wherein the salience level pertains to at least one of: a likelihood that each object captures an attention of the driver of the ego vehicle and a product of object contrast of each object against a background of the driving scene.

7. The computer-implemented method of claim 5, wherein determining the situational awareness probability value associated with each object that is located within the driving scene includes determining an expectancy level that is related to the expectancy associated with each of the objects based on an analysis of the object property-based features, wherein the expectancy level pertains to at least one of: a respective position of each object as compared to a respective position of the ego vehicle and a product of an eye gaze fixation of the driver of the ego vehicle at a particular point in time with respect to each object.

8. The computer-implemented method of claim 5, wherein determining the situational awareness probability value associated with each object that is located within the driving scene includes determining an effort level that is related to the effort associated with each of the objects based on an analysis of the object property-based features, wherein the effort level pertains to at least one of: a level of effort that is involved with respect to the driver of the ego vehicle attending to various objects that are located within the driving scene and an object density of the driving scene.

9. The computer-implemented method of claim 5, wherein determining the situational awareness probability value associated with each object that is located within the driving scene includes determining the cost value associated with each of the objects based on an analysis of the object property-based features, wherein the cost value is representative of cost of missing information associated with each object that is based on at least one of: a classification of each object and a potential likelihood of overlap between a projected path of each respective object and a projected path of the ego vehicle.

10. A system for predicting a driver's situational awareness comprising:
a memory storing instructions when executed by a processor cause the processor to:
receive driving scene data associated with a driving scene of an ego vehicle and eye gaze data to track a driver's eye gaze behavior with respect to the driving scene;
analyze the eye gaze data and determining an eye gaze fixation value for each and every object that is located within the driving scene based on an eye gaze fixation time for each of the objects within the driving scene, wherein determining the eye gaze fixation value includes establishing a global range of eye gaze fixation times for all objects within the driving scene, the global range comprising a global minimum and maximum fixation time across the objects present in the driving scene, computing the eye gaze fixation value for each of the objects within the driving scene by scaling that object's eye gaze fixation time with respect to the global range, and assigning a zero eye gaze fixation value to each object in the driving scene that is not intersected by the driver's gaze, thereby ensuring that all objects are represented in the comparative analysis;
analyze the driving scene data and determining a situational awareness probability value associated with each object that is located within the driving scene that is based on a salience, effort, expectancy, and a cost value associated with each of the objects within the driving scene; and
communicate control signals to electronically control at least one component of the ego vehicle based on the situational awareness probability value and the eye gaze fixation value associated with each of the objects that are located within the driving scene.

11. The system of claim 10, wherein analyzing the eye gaze data and determining the eye gaze fixation value includes extracting eye gaze coordinates from the eye gaze data and analyzing the driving scene data and the eye gaze coordinates that are associated with matching time steps to identify a correspondence between various portions of the driving scene and the driver's eye gaze behavior.

12. The system of claim 11, wherein analyzing the eye gaze data and determining the eye gaze fixation value includes analyzing time coordinates associated with the eye gaze fixation time of the driver's eye gaze behavior with respect to different portions of the driving scene and labeling each object with the eye gaze fixation time of the driver's eye gaze behavior that are included within respective different portions of the driving scene, wherein the eye gaze fixation value is determined as a numerical value that pertains to a labeled eye gaze fixation time with respect to each object, and
the eye gaze fixation value and the situational awareness probability value are aggregated to process a driver object awareness value which pertains to the driver's eye gaze fixation time and a predicted level of situational awareness that the driver of the ego vehicle has with respect to each of the objects that are located within the driving scene.

13. The system of claim 10, wherein analyzing the driving scene data and determining the situational awareness probability value includes analyzing the driving scene data at a respective timeframe at which eye gaze fixations of the driver have been captured to extract object property-based features associated with each object located within the driving scene.

14. The system of claim 13, wherein the object property-based features associated with each object located within the driving scene include at least one of: object contrast, object movement, object relevance, object priority, object size, and object proximity.

15. The system of claim 14, wherein determining the situational awareness probability value associated with each object that is located within the driving scene includes determining a salience level that is related to the salience associated with each of the objects based on an analysis of the object property-based features, wherein the salience level pertains to at least one of: a likelihood that each object captures an attention of the driver of the ego vehicle and a product of object contrast of each object against a background of the driving scene.

16. The system of claim 14, wherein determining the situational awareness probability value associated with each object that is located within the driving scene includes determining an expectancy level that is related to the expectancy associated with each of the objects based on an analysis of the object property-based features, wherein the expectancy level pertains to at least one of: a respective position of each object as compared to a respective position of the ego vehicle and a product of an eye gaze fixation of the driver of the ego vehicle at a particular point in time with respect to each object.

17. The system of claim 14, wherein determining the situational awareness probability value associated with each object that is located within the driving scene includes determining an effort level that is related to the effort associated with each of the objects based on an analysis of the object property-based features, wherein the effort level pertains to at least one of: a level of effort that is involved with respect to the driver of the ego vehicle attending to various objects that are located within the driving scene and an object density of the driving scene.

18. The system of claim 14, wherein determining the situational awareness probability value associated with each object that is located within the driving scene includes determining the cost value associated with each of the objects based on an analysis of the object property-based features, wherein the cost value is representative of cost of missing information associated with each object that is based on at least one of: a classification of each object and a potential likelihood of overlap between a projected path of each respective object and a projected path of the ego vehicle.

19. A non-transitory computer readable storage medium storing instructions that when executed by a computer, which includes a processor performs a method, the method comprising:

receiving driving scene data associated with a driving scene of an ego vehicle and eye gaze data to track a driver's eye gaze behavior with respect to the driving scene;

analyzing the eye gaze data and determining an eye gaze fixation value for each and every object that is located within the driving scene that is based on an eye gaze fixation time for each of the objects within the driving scene, wherein determining the eye gaze fixation value includes establishing a global range of eye gaze fixation times for all objects within the driving scene, the global range comprising a global minimum and maximum fixation time across the objects present in the driving scene, computing the eye gaze fixation value for each of the objects within the driving scene by scaling that object's eye gaze fixation time with respect to the global range, and assigning a zero eye gaze fixation value to each object in the driving scene that is not intersected by the driver's gaze, thereby ensuring that all objects are represented in the comparative analysis;

analyzing the driving scene data and determining a situational awareness probability value associated with each object that is located within the driving scene that is based on a salience, effort, expectancy, and a cost value associated with each of the objects within the driving scene; and communicating control signals to electronically control at least one component of the ego vehicle based on the situational awareness probability value and the eye gaze fixation value associated with each of the objects that are located within the driving scene.

20. The non-transitory computer readable storage medium of claim 19, wherein analyzing the driving scene data and determining the situational awareness probability value includes analyzing the driving scene data at a respective timeframe at which eye gaze fixations of the driver have been captured to extract object property-based features associated with each object located within the driving scene, wherein the object property-based features associated with each object located within the driving scene include at least one of: object contrast, object movement, object relevance, object priority, object size, and object proximity.

* * * * *